United States Patent
Dobbs et al.

(10) Patent No.: US 7,764,184 B2
(45) Date of Patent: Jul. 27, 2010

(54) APPARATUS AND SYSTEM FOR MONITORING ENVIRONMENTAL FACTORS IN A COMPUTER SYSTEM

(75) Inventors: Robert William Dobbs, Granite Bay, CA (US); Terry Lee, Antelope, CA (US); Kenneth Nicholas Konesky, North Highlands, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1070 days.

(21) Appl. No.: 11/022,594

(22) Filed: Dec. 22, 2004

(65) Prior Publication Data

US 2006/0155517 A1    Jul. 13, 2006

(51) Int. Cl.
    *G01W 1/00*    (2006.01)
(52) U.S. Cl. .................. 340/601; 340/825.29; 340/595
(58) Field of Classification Search ............ 340/870.17, 340/501, 825.06, 579–681, 825.29; 709/218
    See application file for complete search history.

(56) References Cited

U.S. PATENT DOCUMENTS

| | | | | |
|---|---|---|---|---|
| 4,447,846 A | * | 5/1984 | McCleery | 361/90 |
| 4,600,962 A | * | 7/1986 | Bliehall | 361/77 |
| 4,823,290 A | * | 4/1989 | Fasack et al. | 340/825.01 |
| 4,868,817 A | | 9/1989 | Shigihara | |
| 4,951,171 A | | 8/1990 | Tran et al. | |
| 5,031,066 A | * | 7/1991 | Wagner et al. | 361/56 |
| 5,115,225 A | * | 5/1992 | Dao et al. | 340/584 |
| 5,566,339 A | | 10/1996 | Perholtz et al. | |
| 6,148,418 A | | 11/2000 | Wang et al. | |
| 6,348,744 B1 | * | 2/2002 | Levesque | 307/86 |
| 6,510,400 B1 | * | 1/2003 | Moriyama | 702/132 |
| 6,651,190 B1 | * | 11/2003 | Worley et al. | 714/43 |
| 6,700,498 B1 | * | 3/2004 | Jeske et al. | 340/635 |
| 6,895,285 B2 | * | 5/2005 | Maity | 700/27 |
| 6,915,343 B1 | * | 7/2005 | Brewer et al. | 709/224 |
| 7,146,521 B1 | * | 12/2006 | Nguyen | 714/2 |
| 2003/0030976 A1 | * | 2/2003 | Garnett et al. | 361/683 |

FOREIGN PATENT DOCUMENTS

| | | |
|---|---|---|
| EP | 0352340 | 6/1995 |
| EP | 0486178 | 7/1996 |

* cited by examiner

*Primary Examiner*—Daniel Previl

(57) ABSTRACT

Embodiments of the present invention present an apparatus coupled to an internal bus for monitoring environmental factors in a computer system including: an embedded controller having a processor; an environmental sensor that provides data related to environmental conditions; a reset generator; and a power source. A LAN interface may be configured to remotely access and control the embedded controller. Further, the internal bus may be selected from any of the following: a PCI bus, an ISA bus, a DIMM slot, a SIMM slot, a PCMCIA slot, or a server blade slot. Still further, the environmental sensor may be selected from any of the following: a DC electrical sensor; an AC electrical sensor; a temperature sensor; a humidity sensor; a force monitor sensor; a signal monitor sensor; an electrostatic discharge sensor; an activity sensor; an optical particulate sensor; a Hall Effect sensor; a global positioning sensor; or a whisker detection sensor.

19 Claims, 4 Drawing Sheets

APPARATUS AND SYSTEM FOR MONITORING ENVIRONMENTAL FACTORS IN A COMPUTER SYSTEM

BACKGROUND

From highly complex computer systems involving vast arrays of information technology to personal computer systems involving only a single user, all computer systems share at least two common needs—Maintenance and repair. Indeed, there exists on the market today, many software tools for analyzing computer systems and diagnosing computer related problems. Some software solutions have been configured to alert a user of potential problems so that a user may proactively address system issues before they mature into full-blown problems. Other solutions allow users to test different configuration scenarios before implementation to ferret out any potential problems. In all cases, software tools allow users to monitor and effect changes to their systems on a continuous or ad hoc basis to create more efficient and robust systems.

In today's computing systems, software solutions may not fully address all aspects of system maintenance. For example, environmental factors, in some cases, may not be ascertainable using conventional software. Environmental factors are those factors such as temperature, heat, shock, etc. which are part of the physical environment in which a system of interest resides. Thus, an electrostatic discharge (ESD) event, in one example, may cause data corruption in a computer system that in turn, may cause the system to fail. In diagnosing the ESD induced failure of the system, a technician may, as a first step, choose to reboot the computer system, which, in this example, might be sufficient to restore that system to operation. However, the root cause of the failure may remain unknown since the solution (i.e. reboot) may not address whether an ESD event has occurred or will recur.

In some instances, a single physical event like an ESD event may be remedied by a simple reboot such as in the preceding example. If no further ESD events subsequently occur, then no other remedy may be required. In other instances, however, a recurring problem, like a recurring ESD event, may present further difficulties. For example, where a computer system is subject to recurring failure due to ESD events caused whenever the system is touched by IT personnel, a software analysis tool may not yield sufficient information for a technician to determine whether the recurring failure is due to an environmental factor. In the previous example, a single reboot after a single ESD event was sufficient to cure the problem. However, in this example, a reboot would only temporarily remedy an immediate failure of the system without addressing the underlying root cause. Diagnosing the problem may be further exacerbated where the system is removed from service and transported to another location for examination. In that case, the physical circumstances in which the system was operating may be difficult or impossible to recreate because an accompanying environmental factor may no longer be present. Thus, operational failures of computer systems deployed in data centers, closets, bunkers, and other diverse environments often have challenging root-cause issues.

Therefore, apparatuses and systems for monitoring environmental factors in a computer system are presented herein.

SUMMARY

Embodiments of the present invention present an apparatus coupled to an internal bus for monitoring environmental factors in a computer system including: an embedded controller having a processor; an environmental sensor that provides data related to environmental conditions; a reset generator; and a power source. A LAN interface may be configured to remotely access and control the embedded controller. Further, the internal bus may be selected from any of the following: a PCI bus, an ISA bus, a DIMM slot, a SIMM slot, a PCMCIA slot, or a server blade slot. Still further, the environmental sensor may be selected from any of the following: a DC electrical sensor; an AC electrical sensor; a temperature sensor; a humidity sensor; a force monitor sensor; a signal monitor sensor; an electrostatic discharge sensor; an activity sensor; an optical particulate sensor; a Hall Effect sensor; a global positioning sensor; or a whisker detection sensor.

In other embodiments, a system for monitoring environmental conditions in a computer system network is presented including: a networked computing system configured so that each system is in electronic communication with every other system in the network; an internal environmental monitoring devices coupled to an internal bus each including: an embedded controller having a processor; a LAN interface configured to remotely access and control the embedded controller; an environmental sensor that provides data related to environmental conditions; a reset generator; and a power source. Further, the internal bus may be selected from any of the following: a PCI bus, an ISA bus, a DIMM slot, a SIMM slot, a PCMCIA slot, or a server blade slot.

In still other embodiments, a system for monitoring environmental conditions in a computer system network is presented including: a networked computing system configured so that each system is in electronic communication with every other system in the network; an external environmental monitoring devices coupled to an external bus each comprising: an embedded controller having a processor; a LAN interface configured to remotely access and control the embedded controller; an environmental sensor that provides data related to environmental conditions; a reset generator; and a power source having a voltage. Further, the external bus may be selected from any of the follow: a parallel port bus, a serial port bus, a universal serial bus, or an IEEE 1394 bus.

In still other embodiments, an apparatus coupled to an internal bus for monitoring environmental factors in a computer system is presented including: an embedded controller means for processing data; a networking interface means for accessing and controlling the embedded controller means; an environmental sensing means for monitoring environmental conditions; a reset means for initializing the embedded controller means; and a power means for providing electrical energy to the apparatus.

In still other embodiments, a method of monitoring environmental conditions in a computer system network is presented including: providing a networked computing system electronically coupled with an environmental monitoring device configured so that each networked computing system may be individually monitored; gathering environmental condition data from the environmental monitoring devices for each of the networked computing systems; displaying environmental condition data such that at least a portion of the environmental condition data for the computer system network may be simultaneously viewed; and logging environmental condition data in memory. Further, in some embodiments, the method may further include: determining threshold environmental conditions which may cause computer system failure; and establishing alarm thresholds based on threshold environmental conditions which may cause computer system failure such that a user may be informed of potential failures based on environmental conditions.

BRIEF DESCRIPTION OF THE DRAWINGS

Embodiments of the invention may best be understood by reference to the following description taken in conjunction with the accompanying drawings in which.

DETAILED DESCRIPTION

The present invention will now be described in detail with reference to a few embodiments herein as illustrated in the accompanying drawings. In the following description, numerous specific details are set forth in order to provide a thorough understanding of the present invention. It will be apparent, however, to one skilled in the art that the present invention may be practiced without some or all of these specific details. In other instances, well known process steps and/or structures have not been described in detail in order to not unnecessarily obscure the present invention.

In accordance with embodiments of the present invention, there are provided apparatuses, methods, and systems for monitoring environmental factors in a computer system. Embodiments of the invention allow a user to account for environmental factors in analyzing failures and potential failures of computer systems and networked computer systems.

Figure 1:
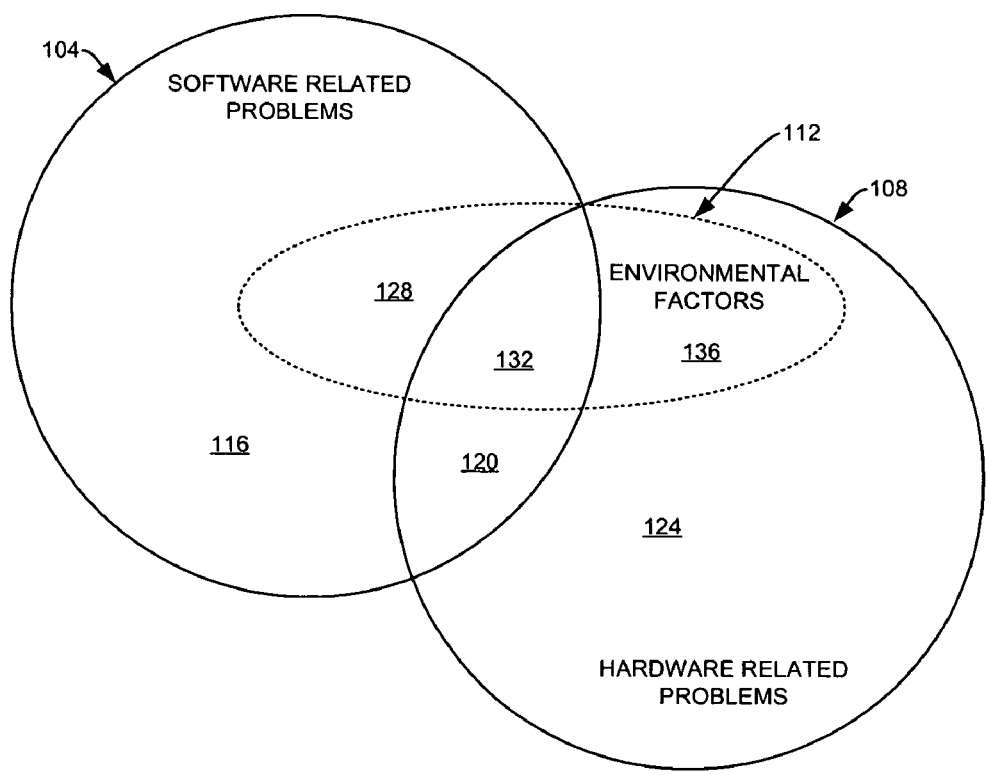
FIG. 1 is a graphical representation of a conceptual framework within which an embodiment of the present invention may be described.

Referring to FIG. 1, FIG. 1 is a graphical representation of a conceptual framework within which an embodiment of the present invention may be described. In particular, two areas of interest—software related problems 104 and hardware related problems 108 are illustrated. These areas of interest correspond to underlying issues related to computer system maintenance. That is, in this example, the sum of related computer system maintenance issues has been reduced to two general areas. Within these general areas 104, 108 is an area comprising environmental factors 112. Environmental factors are those factors related to a physical environment in which a computer system operates. It should be noted that the relative size of the areas circumscribed by the figures illustrated is not representative of the magnitude or number of problems in those areas.

Within the illustrated milieu, six general sub-areas 116-136 are illustrated. In particular, sub-area 116 represents software related problems unrelated to environmental factors and hardware related problems. A typical example of this type of software problem might include corrupted software. That is, software code that, for whatever reason, is not functioning properly. An example of a software problem might include a nested infinite loop that occasionally causes a system failure. Another sub-area 124 represents hardware related problems unrelated to environmental factors and software related problems. One example might be a hardware circuit failure. Another sub-area 120 represents problems related to both hardware and software related problems. This might include, for example, a driver incompatibility issue. That is, a software implemented driver may be inappropriate for a given hardware configuration. Thus, in this instance, neither the software nor the hardware are inherently flawed, however, their inappropriate pairing may result in some type of failure. All three of the sub-areas 116-124 described above are those sub-areas independent of environmental factors.

Other sub-areas 128-136 may be thought of as those problems that, in addition to being related either to software problems, to hardware problems, or to both, also include environmental factors. Thus, sub-area 128 represents software related problems having one or more environmental factors. For example, an occasional ESD may cause a data corruption event because of its proximity to a hard drive or storage device. In this example, the underlying hardware may be functioning perfectly; however, data may be corrupted due to an ESD event. Diagnosis of an event may be difficult since removing hardware from a physical environment in which it normally operates may remove any chance at repeating an ESD event. In this example, knowing that an ESD event occurred immediately previous to a software failure might point a technician directly toward an underlying environmental factor.

Another sub-area 136 represents hardware related problems having one or more environmental factors. For example, many computer hardware components may be susceptible to shock load damage. That is, when a device is dropped, for example, from a table onto a hard surfaced floor, it may incur shock load related damage rendering it inoperable. A technician attempting to diagnose a problem of this nature may be unable to determine a root cause unless there is some external indicator such as a damaged case. Further, removing the device from the physical environment in which the damage took place would likely confound the problem even more, since any clues to physical damage may only exist in places where the device was actually operating. In this example, knowing that a shock load event occurred immediately preceded hardware failure might point a technician directly toward an underlying physical cause.

Another sub-area 132 represents hardware and software related problems having one or more environmental factors. For example, in a highly available clustered network, a shared hardware component may be functioning erratically due to a near field magnetic effect caused by, for example, an AC transformer. Because hardware may behave erratically, a software package controlling that hardware may replace an erratically behaving hardware component with another hardware configuration. In some instances, this action may result in loss of high availability with respect to the cluster. In this example, a technician removing erratically behaving hardware and replacing that hardware with another equivalent piece of hardware hoping to remedy the problem may experience similar behavior in new hardware. A technician may consequently conclude that an underlying problem is software related (since the replacement hardware has not remedied the problem) and then spend time debugging code rather than attacking a root cause (i.e., presence of a stray magnetic field). In attempting to solve either the software aspect of the problem or the hardware aspect of the problem without considering environmental factors, a technician's efforts may ultimately prove futile. In this example, knowing that a magnetic field was detected immediately preceded hardware failure might point a technician directly toward an underlying root cause environmental factor.

In all of the above illustrated sub-areas 128-136, an underlying environmental factor contributed to resulting software, hardware, or combination software/hardware failure. By ascertaining whether a physical event occurred within temporal proximity of a failure, a technician may greatly reduce troubleshooting time. As can be appreciated by one skilled in the art, an added benefit to monitoring environmental factors is that a technician may preemptively address computer system issues by setting threshold limits under which a selected system may safely operate. In this manner, failures may be reduced or avoided altogether.

Figure 2:
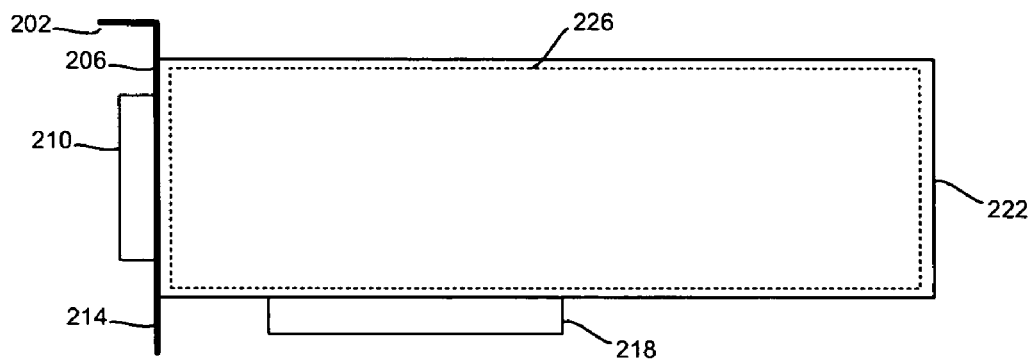
FIG. 2 is a simplified graphical representation of an embodiment of the present invention.

Turning to FIG. 2, FIG. 2 is a simplified graphical representation of an embodiment of the present invention. In particular, FIG. 2 is an illustration of an embodiment of the present invention configured to interface with a peripheral component interconnect (PCI) bus. As can be appreciated, a PCI bus is generally available in most computer systems. The selection of a PCI enabled form factor is for illustrative purposes only and should not be considered limiting. Other form factors using other resident buses may be utilized in any number of embodiments under the present invention including, but not limited to connections with: an ISA bus, a DIMM slot, a SIMM slot, a PCMCIA slot, or a server blade slot. In the illustrated embodiment, bulkhead elements 202, 206, and 214 may be used to support a PCI card in a computer system chassis. Element 210 provides for interface connectors and for an external power source, which will be discussed in further detail for FIG. 3 below. Connector 218 may provide slot power access from a host computer system in an embodiment and will be discussed in further detail for FIG. 3 below. Connector 218 may also provide a connection to support limited signal probing of a host computer. Edge 222 may typically represent a standard PCI card guide edge that may be bracketed or supported by a chassis. Locus 226 represents where circuitry may reside on a face of a PCI card in an embodiment of the present invention.

Although embodiments of the present invention have been described in terms of utilizing a PCI bus, other configurations are contemplated as well including, for example, using an ISA bus, a DIMM slot, a SIMM slot, a PCMCIA slot, or a server blade slot. Furthermore, embodiments of the present invention may also include external configurations that connect with a computer system through, for example, a parallel port bus, a serial port bus, a universal serial bus, or an IEEE 1394 bus. One skilled in the art can appreciate that any number of configurations are contemplated under the present invention.

Figure 3:
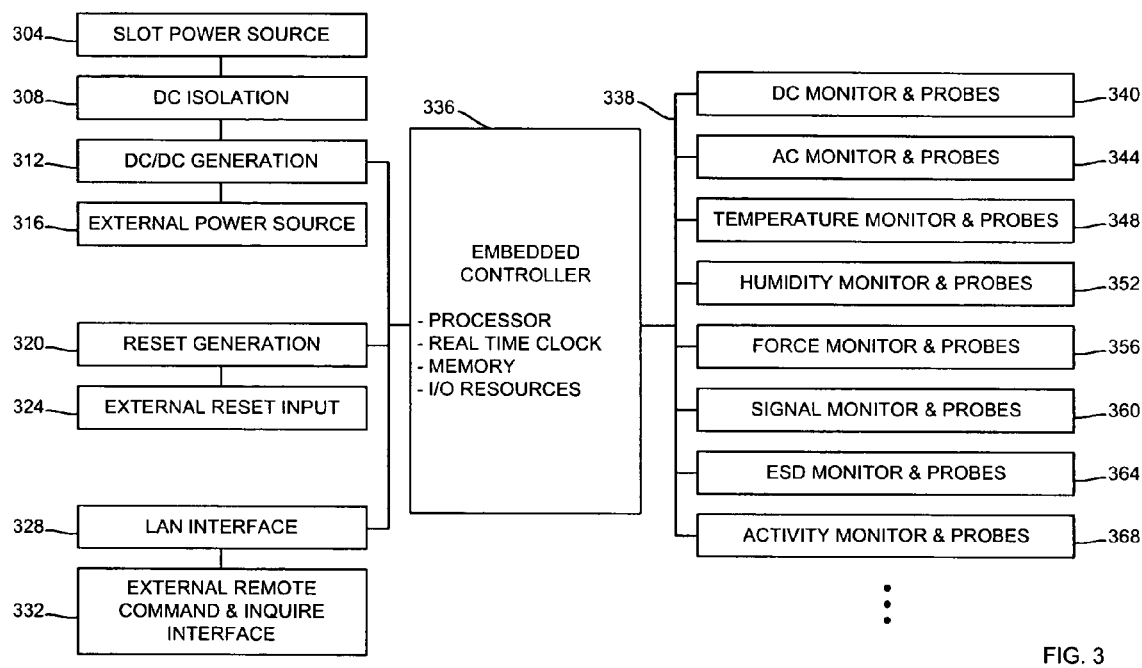
FIG. 3 is a graphical representation of a functional block diagram of an embodiment of the present invention.

Referring to FIG. 3, FIG. 3 is a graphical representation of a functional block diagram of an embodiment of the present invention. Embedded controller 336 functions, in part, to gather information from various attached probes, convert gathered information into usable data, log converted data with a real-time stamp, store logged and time stamped data, and process remote communications. In order to accomplish these tasks embedded controller 336 may have several elements including, for example: a processor for handling any processing needs such as, for example, a data conversion tool; a real-time clock for time keeping functions; memory for storing logged and time stamped data; and I/O resources for handling I/O resources from I/O interface 338. Other resources may include Flash ROM (not shown) for programming and a clock source (not shown) for independence.

More than one power source may be available as illustrated in this embodiment. Referring briefly to FIG. 2, slot power may be accessed by connector 218. Slot power source 304 is power that may be supplied by a host computer system. For example, a PCI bus has approximately 25 watts of power available in a range of voltages (i.e. +12V, +5V, +3.3V, and −12V). Other bus configurations may be employed having varying ranges of voltage. Slot power source 304 may be fed through a DC isolation circuit 308 in order to avoid interaction between the present embodiment and a host computer system. An additional external power source 316 may be utilized to provide independent power to an embodiment and may include an AC power source, a DC power source, or an uninterruptible power supply for example. Again referring to FIG. 2, external power may be received through element 210 or through bulkhead elements 214 or 206. An independent power source may be optionally provided in some embodiments. An independent power source, such as an uninterruptible power supply may provide additional advantages if a host computer system loses power because an independent power source may allow monitoring to continue for a period of time after a power outage. Turning back to FIG. 3, both power sources 304 and 316 may be conditioned by DC/DC generation circuit 312 in order to provide clean power to electronic components.

Embedded controller 336 may receive a reset signal from reset generation circuit 320. Resetting may be necessary where a failure arising from a physical event like, for example, ESD, which might disrupt normal operation. An external reset 324 may be provided as a switch mounted on bulkhead elements 214 or 216 (FIG. 2) or may rely on input from DC/DC generation circuit 312 responding to DC output. Other events may trigger a reset as well and are contemplated under the present invention without limitation.

A LAN interface 328 may be used by technicians to command embedded controller 336 and to retrieve logged and time-stamped data via external remote command and inquire interface 332 running on a remote LAN-connected computer. Any LAN communication protocols well-known in the art may be utilized. An external remote command and inquire interface 332 may be used to coordinate data from multiple LAN-based embodiments as well as to gather data from target servers, room environmental controllers, and other relevant data sources. A LAN implementation of the present invention will be discussed in further detail below for FIG. 4.

Any number of blocks 340-368 may be utilized to assess a physical environment in which a computer system resides. The probes shown in circuit blocks 340-368 are for illustrative purposes only and should not be construed as limiting in any way. The circuit blocks illustrated may be configured to measure average levels, peak levels, and other relevant events. Each circuit block processes probe inputs and reports input data to embedded controller 336. Circuit blocks may use either interrupt or polling methods across I/O bus interface 338.

For example, DC monitor and probes 340 and AC monitor and probes 344 may monitor power and power source related conditions; temperature monitor and probes 348 and humidity monitor and probes 352 may monitor ambient conditions; force monitor and probes 356 and ESD monitor and probes 364 may monitor physical forces which may affect a computer system; and signal monitor and probes 360 and activity monitor and probes 368 may monitor electronic events which may affect a computer system. As one skilled in the art can appreciate, many more monitor and probes may be incorporated under this invention such as, motion sensors, snooping bus activity sensors, Intelligent Platform Management Bus (IPMB) events sensors, Hall Effect sensors, global positioning sensors, whisker concentration sensors, particulate sensors, and service cover removal sensors. Further, as can be appreciated, in some embodiments, embedded controller 336 may be configured to alert a technician if an established threshold setting has been met or exceeded. For example, if a particle count exceeds a threshold setting, an alert may be sent so that a computer system may be properly shut down before data loss occurs.

Figure 4:
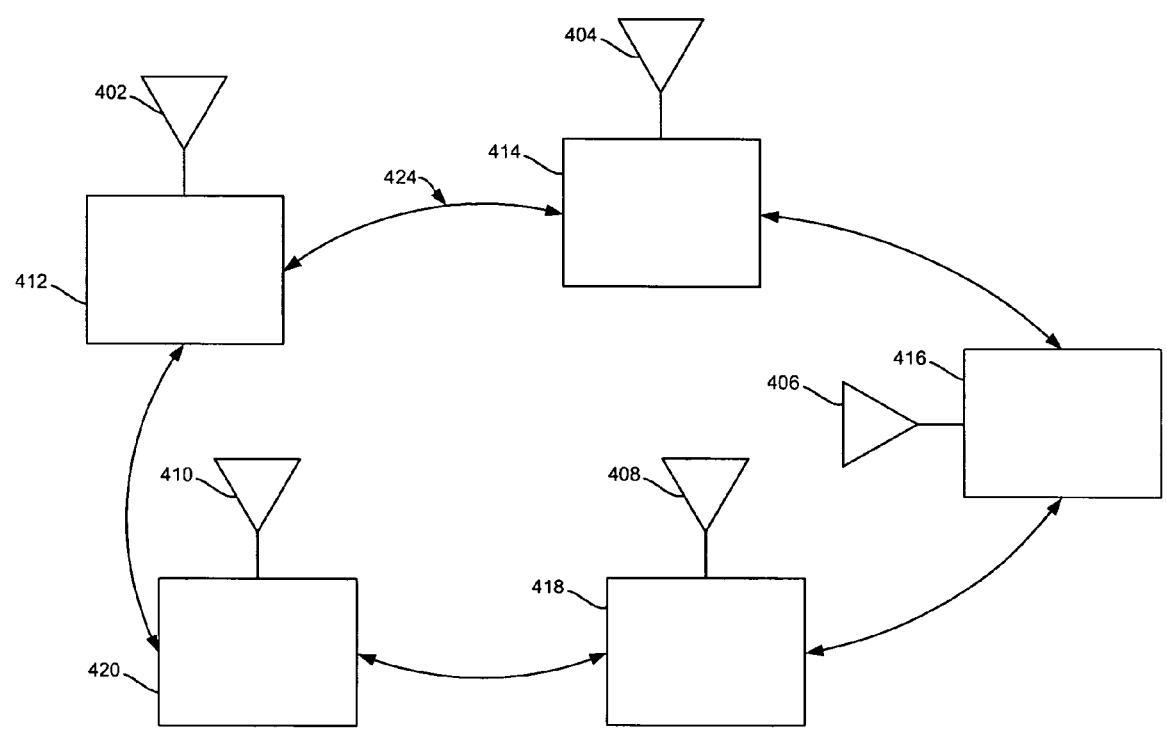
FIG. 4 is a simplified graphical representation of an embodiment of the present invention in a computer network context.

FIG. 4 is a simplified graphical representation of an embodiment of the present invention in a computer network context. In particular, any number of internal or external embodiments 402-410 of the present inventions may be connected with any number of computer systems 412-420, which are, in turn, are part of a networked system. Connection 424 represents a network connection which may be implemented in a wire or wireless configuration over any suitable communication protocol. Furthermore, FIG. 4 represents a logical network configuration as opposed to a physical network configuration. That is, any of computer systems 412-420 may be located in any of a number of different physical locations. So, for example, computer system 412 may be one of several servers in a rack mounted space in a single room along with computer systems 414-420 or may be located in a separate remote location.

One advantage presented by embodiments of the present invention is correlation between failure and temporally distinct environmental factors. For example, a temperature induced failure might be correlated to heating and cooling parameters set by building maintenance personnel. Those personnel may be unfamiliar with cooling requirements for computer systems, assume that an entire building may be "shutdown" during off hours, and establish heating and cooling parameters inconsistent with computer system needs. A rise in temperature occurring during off hours may trigger intermittent failures. Technicians attempting to diagnose this problem may be confounded if they do not realize or recognize an environmental factor (i.e. temperature rise) occurring within a temporal window (i.e. during off hours) may be an underlying root cause for failure. Technicians might instead investigate software and hardware related issues without success.

In another example, hardware shorting may occur due to metallic whiskers forming on electronic contacts. Metallic particles are often present in environments having raised floor panels. When panels such as these are moved, particles break off. These particles may be agitated and introduced into air streams during cleaning of floors or dusting of furniture by building services personnel. The accumulation of particles inhaled by a computer can form metallic whiskers on electronic contacts causing a short. Technicians attempting to diagnose this problem may not recognize that an environmental factor (i.e. dusting leading to airborne particulate matter) occurring within a temporal window (i.e. during scheduled cleaning) may be an underlying root cause for failure. Once again, technicians attempting to diagnose this situation might instead investigate software and hardware related issues without success.

In still another example, embodiments of the present invention may be useful in mixed systems. That is, systems located in a particular locations having both computers utilizing embodiments of the present invention and computers not utilizing embodiments of the present invention. Thus, a server not utilizing an embodiment of the present invention may be diagnosed using data gathered from a server utilizing an embodiment of the present invention where both servers are proximately located. For example, a hot zone may be recorded by a monitoring server or servers having embodiments of the present invention. A non-monitoring server located within that hot zone that fails may benefit from the data collected by monitoring servers. In this manner, geographic and temporal proximity of monitoring servers may be leveraged to provide relevant diagnostic data concerning a non-monitoring server.

While this invention has been described in terms of several embodiments, there are alterations, permutations, and equivalents which fall within the scope of this invention. For example, although the examples herein show embodiments of the present invention on a PCI bus, other buses such as an ISA bus may be utilized. Further, although the examples illustrated are incorporated inside a computer system, an external system may also be used. Indeed, external probes may be desirable even where circuitry is contained within a computer system chassis. It should also be noted that there are many alternative ways of implementing the methods and systems of the present invention. It is therefore intended that the following appended claims be interpreted as including all such alterations, permutations, modifications, and various substitute equivalents as fall within the true spirit and scope of the present invention.

What is claimed is:

1. An apparatus coupled to an internal bus for monitoring environmental factors in a host computer system comprising:
   an embedded controller comprising:
      a processor;
      a real-time clock;
      memory resources for storing acquired data, said acquired data comprising logged and time stamped data having been time stamped according to said real-time clock; and
      independent I/O resources for handling I/O resources from an I/O interface;
   at least one environmental sensor coupled with the embedded controller that provides data related to environmental conditions in which the host computer system operates;
   a reset generator coupled with the embedded controller, the reset generator being configured to provide a reset signal to the embedded controller;
   a power source coupled with the embedded controller, the power source comprising:
      a slot power source having a first voltage supplied by the host computer system;
      DC isolation circuitry configured to electrically isolate the apparatus from the host computer system;
      DC/DC generation circuitry configured to stabilize the first and second voltages; and
      an external power source comprising a second voltage for supplying independent power to the apparatus; and
   a LAN interface configured to remotely access and control the embedded controller.

2. The apparatus of claim 1 wherein the internal bus is selected from the group consisting of: a PCI bus, an ISA bus, a DIMM slot, a SIMM slot, a PCMCIA slot, or a server blade slot.

3. The apparatus of claim 1 wherein the reset generator may be triggered externally.

4. The apparatus of claim 1 wherein the at least one environmental sensor is selected from the group consisting of: a DC electrical sensor; an AC electrical sensor; a temperature sensor; a humidity sensor; a force monitor sensor; a signal monitor sensor; an electrostatic discharge sensor; an activity sensor; an optical particulate sensor; a Hall Effect sensor; a global positioning sensor; or a whisker detection sensor.

5. A system for monitoring environmental conditions in a host computer system network comprising:
   a plurality of networked host computer systems such that each host computer system of the plurality of networked host computer systems is in electronic communication with every other host computer system in the network;
   a plurality of internal environmental monitoring devices coupled to an internal bus, each internal environmental monitoring devices of said plurality of internal environmental monitoring devices comprising:
      an embedded controller comprising:
         a processor;

a real-time clock;

memory resources for storing acquired data, said acquired data comprising logged and time stamped data having been time stamped according to said real-time clock; and independent I/O resources for handling I/O resources from an I/O interface;

a LAN interface configured to remotely access and control the embedded controller;

at least one environmental sensor coupled with the embedded controller that provides data related to environmental conditions in which the each host computer system operates;

a reset generator coupled with the embedded controller, the reset generator being configured to provide a reset signal to the embedded controller; and a power source coupled with the embedded controller, the power source comprising:

a slot power source having a first voltage supplied by the each host computer system;

DC isolation circuitry configured to electrically isolate the apparatus from the each host computer system;

DC/DC generation circuitry configured to stabilize the first and second voltages; and an external power source comprising a second voltage for supplying independent power to the apparatus.

6. The system of claim 5 wherein the internal bus is selected from the group consisting of: a PCI bus, an ISA bus, a DIMM slot, a SIMM slot, a PCMCIA slot, or a server blade slot.

7. The system of claim 5 wherein the at least one environmental sensor is selected from the group consisting of: a DC electrical sensor; an AC electrical sensor; a temperature sensor; a humidity sensor; a force monitor sensor; a signal monitor sensor; an electrostatic discharge sensor; an activity sensor; an optical particulate sensor; a Hall Effect sensor; a global positioning sensor; or a whisker detection sensor.

8. The system of claim 5 wherein the networked host computing systems comprise a cluster.

9. A system for monitoring environmental conditions in a host computer system network comprising:

a plurality of networked host computer systems such that each host computer system of said plurality of networked host computer systems is in electronic communication with every other host computer system in the host computer system network;

a plurality of external environmental monitoring devices coupled to an external bus for monitoring environmental factors in the plurality of host computer systems, each external environmental monitoring device of the plurality of external environmental monitoring devices comprising:

an embedded controller comprising:

a processor;

a real-time clock;

memory resources for storing acquired data, said acquired data comprising logged and time stamped data having been time stamped according to said real-time clock; and independent I/O resources for handling I/O resources from an I/O interface;

a LAN interface configured to remotely access and control the embedded controller;

at least one environmental sensor coupled with the embedded controller that provides data related to environmental conditions in which the each host computer system operates;

a reset generator coupled with the embedded controller, the reset generator being configured to provide a reset signal to the embedded controller; and a power source coupled with the embedded controller, the power source comprising:

a slot power source having a first voltage supplied by the each host computer system;

DC isolation circuitry configured to electrically isolate the apparatus from the each host computer system;

DC/DC generation circuitry configured to stabilize the first voltage; and an external power source having a second voltage for supplying independent power to the apparatus.

10. The system of claim 9 wherein the external bus is selected from the group consisting of: a parallel port bus, a serial port bus, a universal serial bus, or an IEEE 1394 bus.

11. The system of claim 9 wherein the at least one environmental sensor is selected from the group consisting of: a DC electrical sensor; an AC electrical sensor; a temperature sensor; a humidity sensor; a force monitor sensor; a signal monitor sensor; an electrostatic discharge sensor; an activity sensor; an optical particulate sensor; a Hall Effect sensor; a global positioning sensor; or a whisker detection sensor.

12. The system of claim 9 wherein the networked host computing systems comprise a cluster.

13. An apparatus coupled to an internal bus for monitoring environmental factors in a host computer system comprising:

an embedded controller comprising:

a processor;

a real-time clock;

memory resources for storing acquired data, said acquired data comprising logged and time stamped data having been time stamped according to said real-time clock; and independent I/O resources for handling I/O resources from an I/O interface;

a LAN interface configured for remotely accessing and controlling the embedded controller;

at least one environmental sensor coupled with the embedded controller that provides data related to environmental conditions in which the host computer system operates;

a reset generator coupled with the embedded controller, the reset generator being configured to provide a reset signal to the embedded controller; and a power source coupled with the embedded controller, the power source configured for providing electrical energy to the apparatus and comprising:

a slot power source having a first voltage supplied by the host computer system;

DC isolation circuitry configured to electrically isolate the apparatus from the host computer system;

DC/DC generation circuitry configured to stabilize the first and second voltage; and an external power source having a second voltage for supplying independent power to the apparatus.

14. A method of monitoring environmental conditions in a host computer system network comprising:

providing a plurality of networked host computer systems, wherein each host computer system of the plurality of networked host computer systems is electronically coupled with an environmental monitoring device such that the each networked host computer system is individually monitored;

gathering environmental condition data from the environmental monitoring devices for the each of the networked host computer systems, the gathering performed by at least one environmental sensor coupled with an embedded controller, the embedded controller comprising:

a processor;

a real-time clock;

memory resources for storing acquired data, said acquired data comprising logged and time stamped data having been time stamped according to said real-time clock; and independent I/O resources for handling I/O resources from an I/O interface;

displaying the environmental condition data, thereby enabling at least a portion of the environmental condition data for the host computer system network to be simultaneously viewed;

logging the environmental condition data in memory, said environmental condition data comprising said acquired data, providing a LAN interface configured to enable remote access and control of the embedded controller; and utilizing an alternate power means to enable the environmental monitoring device to continue to monitor each networked host computer system regardless of a failure of a power supply of the each networked host computer system, the power means comprising:

a slot power source having a first voltage supplied by the each networked host computer system;

DC isolation circuitry configured to electrically isolate the environmental monitoring device from the each host computer system;

DC/DC generation circuitry configured to stabilize the first and second voltage; and an external power source having a second voltage for supplying independent power to the environmental monitoring device.

15. The method of claim 14 further comprising determining threshold environmental conditions which may cause host computer system failure; and establishing alarm thresholds based on threshold environmental conditions which may cause host computer system failure such that a user is informed of potential failures based on environmental conditions.

16. The method of claim 14 wherein the environmental monitoring device is an internal device coupled to an internal bus.

17. The method of claim 16 wherein the internal bus is selected from the group consisting of: a PCI bus, an ISA bus, a DIMM slot, a SIMM slot, a PCMCIA slot, or a server blade slot.

18. The method of claim 14 wherein the environmental monitoring device is an external device coupled to an external bus.

19. The method of claim 18 wherein the external bus is selected from the group consisting of: a parallel port bus, a serial port bus, a universal serial bus, or an IEEE 1394 bus.

* * * * *